(12) United States Patent
Deng et al.

(10) Patent No.: US 7,750,234 B2
(45) Date of Patent: Jul. 6, 2010

(54) INTEGRATED PHOTOELECTROCHEMICAL CELL AND SYSTEM HAVING A LIQUID ELECTROLYTE

(75) Inventors: Xunming Deng, Sylvania, OH (US); Liwei Xu, Sylvania, OH (US)

(73) Assignee: The University Of Toledo, Toledo, OH (US)

( * ) Notice: Subject to any disclaimer, the term of this patent is extended or adjusted under 35 U.S.C. 154(b) by 1353 days.

(21) Appl. No.: 11/134,929

(22) Filed: May 23, 2005

(65) Prior Publication Data

US 2005/0211290 A1    Sep. 29, 2005

Related U.S. Application Data

(63) Continuation of application No. PCT/US03/037543, filed on Nov. 24, 2003.

(60) Provisional application No. 60/429,753, filed on Nov. 27, 2002.

(51) Int. Cl.
*H01L 31/00* (2006.01)

(52) U.S. Cl. .................. 136/252; 136/258; 204/252; 204/263; 204/266

(58) Field of Classification Search ............... 136/252, 136/258; 204/252, 263, 266
See application file for complete search history.

(56) References Cited

U.S. PATENT DOCUMENTS

| 3,811,953 | A | 5/1974 | Nozik |
| 4,011,149 | A | 3/1977 | Nozik |
| 4,090,933 | A | 5/1978 | Nozik |
| 4,118,294 | A | 10/1978 | Pellegri |
| 4,144,147 | A | 3/1979 | Jarrett et al. |
| 4,172,925 | A | 10/1979 | Chen et al. |
| 4,215,182 | A | 7/1980 | Ang et al. |
| 4,236,984 | A | 12/1980 | Grantham |
| 4,310,405 | A | * | 1/1982 | Heller ................. 204/252 |
| 4,315,973 | A | 2/1982 | Manassen et al. |
| 4,316,049 | A | 2/1982 | Hanak |
| 4,335,266 | A | 6/1982 | Mickelsen et al. |
| 4,385,971 | A | 5/1983 | Swartz |
| 4,419,530 | A | 12/1983 | Nath |
| 4,419,578 | A | 12/1983 | Kress |
| 4,427,749 | A | 1/1984 | Graetzel et al. |

(Continued)

FOREIGN PATENT DOCUMENTS

JP    362092380    4/1987

(Continued)

OTHER PUBLICATIONS

IPER for WO 2004/049459, (PCT/US03/37733), Feb. 10, 2005, Deng et al.

(Continued)

*Primary Examiner*—Harry D. Wilkins, III
*Assistant Examiner*—Nicholas A. Smith
(74) *Attorney, Agent, or Firm*—MacMillan, Sobanski & Todd, LLC (57) ABSTRACT

An integrated photoelectrochemical (PEC) cell generates hydrogen and oxygen from water while being illuminated with radiation. The PEC cell employs a liquid electrolyte, a multi-junction photovoltaic electrode, and a thin ion-exchange membrane. A PEC system and a method of making such PEC cell and PEC system are also disclosed.

73 Claims, 6 Drawing Sheets

U.S. PATENT DOCUMENTS

| | | | |
|---|---|---|---|
| 4,451,970 A | 6/1984 | Izu et al. | |
| 4,464,823 A | 8/1984 | Izu et al. | |
| 4,492,743 A * | 1/1985 | Howe | 429/111 |
| 4,501,804 A | 2/1985 | Bochris et al. | |
| 4,510,674 A | 4/1985 | Izu et al. | |
| 4,510,675 A | 4/1985 | Izu et al. | |
| 4,511,638 A | 4/1985 | Sapru et al. | |
| 4,528,252 A | 7/1985 | Yamazaki | |
| 4,544,470 A | 10/1985 | Hetrick | |
| 4,598,306 A | 7/1986 | Nath et al. | |
| 4,628,013 A | 12/1986 | Figard et al. | |
| 4,643,817 A | 2/1987 | Appleby | |
| 4,650,554 A | 3/1987 | Gordon | |
| 4,656,103 A | 4/1987 | Reichman et al. | |
| 4,729,970 A | 3/1988 | Nath et al. | |
| 4,785,186 A | 11/1988 | Street et al. | |
| 4,963,508 A | 10/1990 | Umeno et al. | |
| 5,019,227 A | 5/1991 | White et al. | |
| 5,032,884 A | 7/1991 | Yamagishi et al. | |
| 5,055,416 A | 10/1991 | Weber | |
| 5,084,400 A | 1/1992 | Nath et al. | |
| 5,091,886 A | 2/1992 | Miyawaki et al. | |
| 5,107,104 A | 4/1992 | Miyasaka | |
| 5,117,114 A | 5/1992 | Street et al. | |
| 5,131,954 A | 7/1992 | Vogeli et al. | |
| 5,156,979 A | 10/1992 | Sato et al. | |
| 5,320,723 A | 6/1994 | Kawakami | |
| 5,693,947 A | 12/1997 | Morton | |
| 5,785,768 A * | 7/1998 | Nakata | 136/250 |
| 5,859,397 A | 1/1999 | Ichinose et al. | |
| 5,885,725 A | 3/1999 | Toyama et al. | |
| 5,916,678 A | 6/1999 | Jackson et al. | |
| 6,132,585 A | 10/2000 | Midorikawa et al. | |
| 6,150,605 A | 11/2000 | Han | |
| 6,153,823 A | 11/2000 | Shiozaki et al. | |
| 6,198,037 B1 | 3/2001 | Nakata | |
| 6,221,685 B1 | 4/2001 | Ichinose et al. | |
| 6,222,115 B1 | 4/2001 | Nakanishi | |
| 6,242,686 B1 | 6/2001 | Kishimoto et al. | |
| 6,361,660 B1 | 3/2002 | Goldstein | |
| 6,471,834 B2 | 10/2002 | Roe et al. | |
| 6,471,850 B2 | 10/2002 | Shiepe et al. | |
| 6,533,919 B1 * | 3/2003 | Narayanan et al. | 205/637 |
| 6,566,594 B2 | 5/2003 | Sano et al. | |
| 6,787,385 B2 * | 9/2004 | Barber et al. | 438/57 |
| 6,900,382 B2 * | 5/2005 | Chittibabu et al. | 136/256 |
| 7,271,334 B2 | 9/2007 | Gratzel et al. | |
| 2004/0003837 A1 | 1/2004 | Mauk | |
| 2005/0092357 A1 | 5/2005 | Deng | |
| 2005/0205128 A1 | 9/2005 | Deng | |
| 2005/0211290 A1 | 9/2005 | Deng | |
| 2007/0256729 A1 | 11/2007 | Vijh et al. | |
| 2008/0000524 A1 | 1/2008 | Deng | |

FOREIGN PATENT DOCUMENTS

| | | |
|---|---|---|
| JP | 2277592 | 11/1990 |
| JP | 408051227 | 2/1996 |
| JP | 2000264053 | 9/2000 |
| WO | WO 2004/049459 | 6/2004 |
| WO | WO 2004/050961 | 6/2004 |
| WO | WO 2005/081326 | 9/2005 |
| WO | WO 2005/101510 | 10/2005 |
| WO | WO 2006/110613 | 10/2006 |

OTHER PUBLICATIONS

Written Opinion for WO 2004/050961, (PCT/US03/37543), Oct. 31, 2007, Deng et al.

IPER for WO 2005/081326, (PCT/US05/005121), May 27, 2005, Deng et al.

IPER for WO 2005/101510, (PCT/US05/12777), Oct. 27, 2005, Vijh et al.

IPER for WO 2006/110613, (PCT/US06/013222), Jan. 17, 2008, Adiga et al.

Miller, E.L.; Rocheleau, R.E., Deng, X.M., Design considerations for a hybrid amorphous silicon/photo electrochemical multi-junction cell for hydrogen production, Int. J. Hydrogen Energy, 28(6), 2003, 615-623.

Bak, T.; Nowotny, J.; Rekas, M.; Sorrell, C.C., Photo-electrochemical hydrogen generation from water using solar energy, Materials-related aspects, Int. J. Hydrogen Energy, 27 (10), 2002, 991-1022.

Ohmori, T.; Go, H.; Yamaguchi, N.; Nakayama, A.; Mametsuka, H.; Suzuki, E., Photovoltaic water electrolysis using the sputter-deposited a-Si/c-Si solar cells, Int. J. Hydrogen Energy 26 (7), 2001, 661-664.

Ulleberg, O., Modeling of advanced alkaline electrolyzers: a system simulation approach, Int. J. Hydrogen Energy, 28(1), 2003, 21-33.

El-Shatter, Th. F., Eskandar, M.N., El-Hagry, M.T., Hybrid PV/fuel cell system design and simulation, Renewable Energy 27(2002) 479-485.

Hollmuller, P., Joubert, J-M., Lachal, B., Yvon, K., Evaluation of a 5 $kW_p$ photovoltaic hydrogen production and storage installation for a residential home in Switzerland, Int. J. Hydrogen Energy, 25 (2) 2000, 97-109.

Abaoud, H., Steeb, H., The German-Saudi Hysolar Program, Int. J. Hydrogen Energy, 23(6) 1998, 445-449.

Szyszka, A., Ten years of solar hydrogen demonstration project at Neunburg Vorm Wald, Germany, Int. J Hydrogen Energy, 23(10), 1998, 849-860.

Perez-Mendez, V., Morel, J., Kaplan, S. N., Street, R. A., Detection of Charged Particles in Amorphous Silicon Layers, Nuclear Instruments and Methods in Physics Research, 252, 1986, 478-482.

Hong, W.S., Mireshghi, A., Drewery, J.S., Jing, T., Kitsuno, Y., Lee, H., Kaplan, S.N., Perez-Mendez, V., Charged Particle Detectors Based on High Quality Amorphous Silicon Deposited with Hydrogen or Helium Dilution of Silane, IEEE Transactions on Nuclear Science, 42(4), Aug. 1995, p. 240-246.

Holcomb, D. E., Wintenburg, A., Deng, X.M., Pixelated Neutron Beam Monitor Development, Proc. of International Workshop on position-sensitive detectors, held at Hahn-Meitner-Institut, Berlin, Germany, Jun. 28-30 (2001).

Deng, X.M., Jones, S.J., Liu, T., Izu, M., Ovshinsky, S.R., Improved µc-Si p-layer and a-Si i-layer materials using VHF plasma deposition, in Conference Record of the Twenty Sixth IEEE Photovoltaic Specialists Conference—1997, p. 591-594 (1997).

Wang, W., Povolny, H.S., Du, W., Liao, X.B., Deng, X.M., Triple-Junction a-Si Solar Cells with Heavily Doped Thin Interface Layers at the Tunnel Junctions, in Proc. of IEEE $29^{th}$ Photovoltaic Specialist Conference, 2002.

Roussillon, Y.; Giolando, D. M.; Shvydka, D.; Compaan, A. D.; Karpov, V. G., Blocking thin-film nonuniformities: Photovoltaic self-healing, Applied Physics Letters, 84, 2004, 616-618.

Kymakis, E., Alexandrou, I., Amaratunga, G.A.J., High open-circuit voltage photovoltaic devices from carbon-nanotube-polymer composites, J. Application. Phys. 93 (3), 2003, 1764-1768.

Agarwal, P., Povolny, H., Han, S., Deng, X.M., Study of SiGe:H Films and n-i-p Devices used in High Efficiency Triple Junction Solar Cells, J. Non-Crystalline Solids, vol. 299-302, 2002, pp. 1213-1218.

Rocheleau, R. E., Miller, E.L., Photoelectrochemical Production of Hydrogen: Engineering Loss Analysis, Int. J. Hydrogen Energy, 22., 1997, 771-782.

Written Opinion for PCT related case PCT/US03/37543, Oct. 31, 2007, Deng et al.

J.R. Bolton "Solar photoproduction of hydrogen: a review", Solar Energy, 57, 37 (1996).

S.S. Kocha, D. Montgomery, M.W. Peterson, J.A. Turner, "Photoelectrochemical decomposition of water utilizing monolithic tandem cells", Solar Energy Materials & Solar Cells, 52, 389 (1998).

S. Licht, "Efficient solar generation of hydrogen fuel—a fundamental analysis", Electrochemistry Communications 4, 790 (2002).

P.K. Shukla, R.K. Karn, A.K. Singh, O.N. Srivastava, "Studies on PV assisted PEC solar cells for hydrogen production through photoelectrolysis of water", Int. J. of Hydrogen Energy, 27, 135 (2002).

X. Gao, S. Kocha, A. Frank, J.A. Turner, "Photoelectrochemical decomposition of water using modified monolithic tandem cells", Int. J. of Hydrogen Energy, 24, 319 (1999).

R.E. Rocheleau and E.L. Miller, "Photoelectrochemical production of hydrogen: Engineering loss analysis", Int. J. Hydrogen Energy, 22, 771 (1997).

Search Report for priority appln PCT/US03/37543 dated Apr. 9, 2004.

* cited by examiner

INTEGRATED PHOTOELECTROCHEMICAL CELL AND SYSTEM HAVING A LIQUID ELECTROLYTE

CROSS REFERENCE TO RELATED APPLICATION

This application is a continuation of co-pending International Patent Application No. PCT/US2003/037543 filed Nov. 24, 2003, claiming priority to U.S. Patent Application No. 60/429,753 filed Nov. 27, 2002. International Patent Application PCT/US2003/037543 was published as WO2004/050961 on Jun. 17, 2004 in English under PCT Article 21(2).

This invention was made with Government support under National Renewable Energy Laboratory (NREL) contract No. NDJ-1-30630-08 awarded by the Department of Energy, and under ARL-WPAFB Grant "Photovoltaic Hydrogen for Portable, On-Demand Power" awarded to the University of Toledo under subcontract 03-S530-0011-01C1 under the primary contract F33615-02-D-2299 through the Universal Technology Corporation. The government has certain rights in this invention.

FIELD OF THE INVENTION

The instant invention relates generally to the generation of hydrogen and oxygen from water through a photo-electrolysis process and more particularly to the generation of hydrogen using solar radiation.

BACKGROUND OF THE INVENTION

Future transportation is widely believed to be based on a hydrogen economy. Using fuel cells, cars and trucks will no longer burn petroleum and will no longer emit $CO_2$ on the streets since they will use hydrogen as the fuel and the only byproduct is water. However, the reforming process, the main process that is used in today's hydrogen production, still uses petroleum-based products as the raw material and still emits large amounts of $CO_2$. To reduce our society's reliance on petroleum based products and to avoid the emission of $CO_2$ that causes global warming, a renewable method of generating hydrogen must be developed. An electrolysis process using only sunlight and water is considered to be a top choice for hydrogen generation. Such hydrogen fuel is ideal for proton exchange membrane fuel cell (PEMFC) applications since it contains extremely low concentrations of carbon monoxide, which is poisonous to platinum catalysts in PEM fuel cells. However, indirect photo-electrolysis, in which the photovoltaic cells and electrodes are separated and connected electrically using external wires, is not cost-effective. An integrated photoelectrochemical cell (PEC) offers the potential to generate hydrogen renewably and cost effectively.

Several prior inventions and publications have disclosed designs for photoelectrochemical cells. U.S. Pat. No. 4,090,933 (Nozik), U.S. Pat. No. 4,144,147 (Jarrett et al.), U.S. Pat. No. 4,236,984 (Grantham), U.S. Pat. No. 4,544,470 (Hetrick), U.S. Pat. No. 4,310,405 (Heller), U.S. Pat. No. 4,628,013 (Figard et al.), U.S. Pat. No. 4,650,554 (Gordon), U.S. Pat. No. 4,656,103 (Reichman et al.), U.S. Pat. No. 5,019,227 (White et al.), U.S. Pat. No. 6,471,850 (Shiepe et al.), U.S. Pat. No. 6,361,660 (Goldstein), U.S. Pat. No. 6,471,834 (Roe et al.).

J. R. Bolton "Solar photoproduction of hydrogen: a review", Solar Energy, 57, 37 (1996).

S. S. Kocha, D. Montgomery, M. W. Peterson, J. A. Turner, "Photoelectrochemical decomposition of water utilizing monolithic tandem cells", Solar Energy Materials & Solar Cells, 52, 389 (1998).

S. Licht, "Efficient solar generation of hydrogen fuel—a fundamental analysis", Electrochemistry Communications 4, 790 (2002).

P. K. Shukla, R. K. Karn, A. K. Singh, O. N. Srivastava, "Studies on PV assisted PEC solar cells for hydrogen production through photoelectrolysis of water", Int. J. of Hydrogen Energy, 27, 135 (2002).

X. Gao, S. Kocha, A. Frank, J. A. Turner, "Photoelectrochemical decomposition of water using modified monolithic tandem cells", In. J. of Hydrogen Energy, 24, 319 (1999).

R. E. Rocheleau and E. L. Miller, "Photoelectrochemical production of hydrogen: Engineering loss analysis", Int. J. Hydrogen Energy, 22, 771 (1997).

However, the prior art devices and methods described and disclosed in these above mentioned patents and publications have at least one of the following shortcomings:

the photovoltaic cell does not generate sufficient voltage to split water,
the photovoltaic cell needs an external electrical bias for the electrolysis,
the photovoltaic device will not survive for extended use in the electrolyte due to inappropriate protection,
the photovoltaic device cannot be fabricated using low-cost methods, and
the photovoltaic device does not have potential for high conversion efficiency.

Therefore, there is a compelling and crucial need in the art for an efficient PEC device that produces hydrogen from water under radiation, does not require external bias due to sufficient voltage, and can be made at low cost.

SUMMARY OF THE INVENTION

The instant invention provides a photoelectrochemical (PEC) cell that splits water under radiation and generates hydrogen and oxygen. In this PEC cell, a photovoltaic (PV) electrode, comprised of a multiple-junction solar cell and appropriate coatings and catalysts, is placed in an electrolyte, either acidic or alkaline. Under radiation such as sunlight, the PV electrode generates a voltage that is sufficient to drive electrolysis and produces hydrogen and oxygen. A membrane is installed in the PEC cell to allow exchange of ions for the electrolysis yet separate and confine the hydrogen and oxygen gases into two different compartments of the cell. A design that increases the efficiency of the hydrogen and oxygen production and minimizes the cost of the PEC cell is also disclosed.

The PV electrode uses a multiple-junction approach to generate a voltage sufficient to split water. The theoretical limit for water-splitting voltage is 1.23V. Practically, however, due to the existence of overpotentials at the electrolyte/electrode interfaces, the voltage needed is approximately 1.6V or greater. The PV structure that generates such a voltage under radiation, such as sunlight, should have a voltage of approximately 1.6V or greater under operating conditions.

There are two ways to achieve the required voltage for water splitting in the multijunction electrode: 1) multi-junction photoelectrode in which all junctions are based on solid-state semiconductors and the top surface of the photoelectrode is covered with a layer of transparent, conducting and corrosion-resistant (TCCR) layer; and 2) multi-junction photoelectrode in which the top junction (the one facing on the side of radiation) is a liquid junction between a semiconductor layer and the electrolyte.

1) Multi-Junction Photoelectrode with all Semiconductor Junctions:

An example of this PV structure is a two-junction or three-junction amorphous silicon alloy solar cells stack which is comprised of semiconductor layers. The polarity of the photoelectrode can be in both ways, with either the positive or negative side facing the radiation. When the positive side is facing the radiation, oxidation occurs on this side (anode) and oxygen gas is generated on the front surface (facing radiation) while hydrogen is generated in the back surface (on the substrate side, opposition to the radiation), which is the cathode.

In certain embodiments, transparent, conducting and corrosion-resistant coating is applied at the front surface of the photoelectrode to protect the semiconductor layers.

1A: Metal Oxides as TCCR Coatings

Fluorine doped tin oxide—Fluorine doped tin oxide ($SnO_2$:F) is transparent, conducting and corrosion resistant. It can be deposited using many methods including sputtering, APCVD, etc.

Titanium, tungsten and iron oxides—$TiO_2$, $WO_3$ and $Fe_2O_3$, and modifications from these basic oxides, are stable in electrolyte. These oxides are alloyed with other elements to remove the rectifying junction between these oxides and electrodes. Various approaches including doping, alloying, and surface modification can be used to achieve an ohmic contact between these oxides and electrolyte.

1B: Nitrides and Carbides as TCCR Coatings

Nitrides—Various nitrides such as InGaN, GaPN, and GaAsPN are useful as the TCCR coating.

Carbides—Various carbide materials such as silicon carbide and germanium carbide are useful as the TCCR coating. Deposition technique such as very high frequency (VHF) plasma enhanced CVD and the hot-wire CVD are useful for these coatings.

1C: Polymer Composites

Polymer nanocomposites can be made transparent and corrosion resistant. By adding a small amount of metal, these nanocomposite are made sufficiently conductive (needs to be <$10^5$ Ω·cm) for use as the TCCR coating.

2) Hybrid Multi-Junction Photoelectrode with Semiconductor-Electrolyte Liquid Junction as the Top Junction:

Wide gap compound semiconductor (WGCS) that forms an efficient junction with the electrolyte yet generates sufficient current so that it is matched with the other component solar cells in the multi-junction stack.

2A: Alloying of Metal Oxides to Increase Absorption

To increase the absorption and hence the photo generated electrical current, $TiO_2$, $WO_3$ and $Fe_2O_3$ are alloyed with other materials to have its bandgaps reduced. Useful candidate materials for the alloys include Ca and Mg.

2B: III-V Based Compounds and Carbides for Liquid Junction

III-V compound semiconductor materials such as n-type InGaN, GaPN, GaAsPN, and GaP and Group IV compound semiconductors such as SiC and GeC are useful for liquid junction with the electrolyte.

The electrolyte can be either acidic (such as $H_2SO_4$) or alkaline (such as KOH). Examples of the half and combined reactions, for each type of the electrolyte is as following:

Acidic:

$2H^+ + 2e^- \rightarrow H_2$ (reduction at cathode)

$2H_2O \rightarrow 4H^+ + O_2 + 4e^-$ (oxidation at anode)

Combined reaction: $2H_2O \rightarrow 2H_2 + O_2$ \hfill (1)

Or Alkaline:

$2H_2O + 2e^- \rightarrow H_2 + 2OH$ (reduction at cathode)

$4OH \rightarrow O_2 + 2H_2O + 4e^-$ (oxidation at anode)

Combined reaction: $2H_2O \rightarrow 2H_2 + O_2$ \hfill (2)

The hydrogen and oxygen gases are produced in two different compartments, separated by a membrane. The membranes conduct ions but separate the gases. The membranes are installed in a way that allows for maximum radiation to reach the photoelectrode. In certain embodiments, one way for installing the membrane is to put the membrane in the same direction as the radiation. In other embodiments, another way is to put the membrane behind the substrate. A cation-exchange membrane is used for the conduction of $H^+$ for the acidic electrolyte and anion-exchange membrane is used for the conduction of $OH^-$ in the alkaline electrolyte. When the membranes are installed perpendicular to the photoelectrode (for example, vertically), the hydrogen and oxygen gases can be separated also by gravity, away from the membrane. In this way, the required thickness of membrane is small, leading to significant reduction in material cost and increased conduction of ions.

This instant invention also provides a PEC system that integrates the above-disclosed PEC cell with supporting structures and auxiliary components which form a stand-alone system for hydrogen generation. In such a system, electrolyte is circulating through the PEC system, flushing out gas bubbles and providing water for electrolysis. Such a PEC system is completely self-sustained. The supporting structure and auxiliary components include the mounting mechanisms of various components, mechanisms for electrolyte circulation through the PEC cell, and, when and where needed, containers to collect hydrogen and oxygen gases.

The instant invention further provides a method to fabricate the above disclosed PEC cell and PEC system.

The PEC cell described herein uses a small amount of electrolyte, making the system lightweight and portable. The PEC cell also increases the flow of electrolyte so that gas bubbles can be efficiently flushed out of, or removed from, the electrode surfaces. In certain embodiments, the PEC cell design uses a molded plastic contact and flat top pieces, making it easy to fabricate, thus reducing manufacturing costs.

The above disclosed PEC cell and system offer significant advantages such as high conversion efficiency, efficient electrolysis, low cost, and high durability. It is understood that, in certain embodiments, for PEM fuel cells (PEMFC) where Pt is used as a catalyst, Pt could be poisoned by CO gas, thus resulting in reduced performance. However, the hydrogen fuels generated using such a PEC system contain extremely low amount of carbon monoxide, making such hydrogen ideal for PEMFC. The above-mentioned PEC system, when used in combination with portable fuel cells, provides distributed, and portable, power generation. The energy can be stored in hydrogen form. Since there is radiation such as sunlight everyday, the required storage for such combined PEC/PEMFC system does not need to be large, thus resulting in reduced costs.

The foregoing has outlined in broad terms the more important features of the invention disclosed herein so that the detailed description that follows may be more clearly understood, and so that the contribution of the instant inventor to the art may be better appreciated. The instant invention is not to be limited in its appreciation to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

FIGS. 1a, 1b and 1c are schematic diagrams of the PEC cell showing the PV electrode, the membrane, and the two compartments separated by the membrane. FIG. 1a is the front sectional view while

FIG. 3 is a schematic of the end adaptor of the PE cell for the collection of hydrogen and oxygen gases and circulation of electrolyte.

DETAILED DESCRIPTION OF THE PREFERRED EMBODIMENTS

In one aspect, the present invention relates to a photoelectrochemical (PEC) cell having at least one photovoltaic electrode that generates voltage under radiation; at least one electrolyte; a container that confines electrolyte; a top cover that is substantially transparent to radiation; at least one mechanism that separates the container into two compartment for oxidation and reduction reactions; and a structure that allows maximum radiation to reach the active area of the photoelectrode. In certain aspects, the PEC cell has a top-most junction that is closest to the radiation in the photovoltaic electrode and the top-most junction comprises a liquid junction between a semiconductor and the electrolyte. In other aspects, the semiconductor that forms a junction with the electrolyte comprises at least one metal oxide that is stable in the electrolyte.

Description of the PEC Cell

Figure 1A:
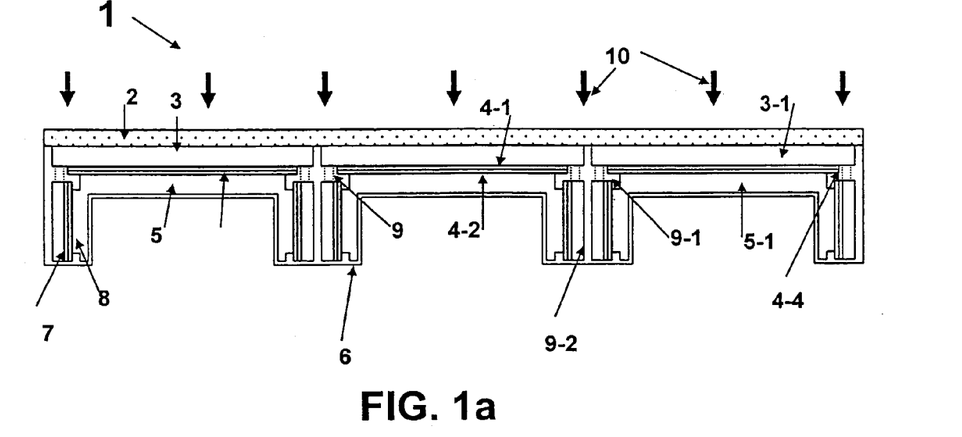

An example of the PEC cell is depicted in FIG. 1a. The PEC cell 1 consists of a top cover 2, a holder/container 6, a photovoltaic electrode 4, membranes 7 and other components. The photoelectrode 4 and membrane 7 separate the PEC cell into two compartments 3 and 5, in which oxidation and reduction half reactions take place, respectively. The photoelectrode 4, under radiation 10, which penetrates through the largely transparent top cover 2, generates a voltage that is around or above 1.6 eV and is sufficient to drive water electrolysis. The photoelectrode 4 is a photovoltaic cell comprised of a stack, or plurality of, layers of semiconductor materials, deposited on a conducting substrate, as will be described in detail below. The two sides of the photoelectrode serve as the anode and cathode, respectively. The polarity depends on the sequence of the p-type and n-type doped layers in the semiconductor stack, which forms the photovoltaic cell 4. A thin coating of membrane 7 applied on a support 8 allows the exchange of ions while separating gases generated in the anode and cathode inside the two compartment 3 and 5, respectively.

When radiation 10 such as sunlight is irradiated on the photoelectrode 4 through the largely transparent top cover 2, a voltage is generated. When a multiple-junction photovoltaic cell is used, the voltage can be around or higher than 1.6 V, which is sufficient for water electrolysis. Hydrogen and oxygen are generated in the two compartments. If the p-type semiconductor layer is at a top side 4-1 of the electrode 4 in FIG. 1, i.e., facing radiation 10 and closer to compartment 3, and n-type semiconductor layer is at a bottom side 4-2 of the electrode 4, a positive electrical bias is then generated at the top surface 4-1, the anode, and a negative bias is generated at the bottom surface 4-2, the cathode. Oxygen is recovered from of the top compartment 3 and hydrogen is recovered from the bottom compartment 5. If the polarity of the semiconductor layers comprising the electrode 4 is reversed, the reduction and oxidation reactions will switch sides.

Both acidic and basic electrolytes are useful for the electrolysis. An example of the acidic electrolyte is $H_2SO_4$ and an example of alkaline electrolyte is KOH. The membrane 7 is applied onto a porous substrate 8. the porous substrate 8 allows electrolyte to flow through the substrate 8 yet provides mechanical strength to support the membrane 7. The membrane 7 can be made to be extremely thin to reduce cost. An example of the supporting material is micro-porous polypropylene.

The PEC cell 1 further includes via holes 9 which are defined by at least one mounting mechanism 9-1. The via holes 9 allow the electrolyte E flow through the membrane 7. In certain embodiments, the holder/container 6 can be made of plastic, glass or other suitable materials that provide mechanical support yet are resistant to the corrosion from the electrolyte. Also, in certain embodiments, there can be flow guides 3-1 and/or 5-1 are installed in the compartments 3 and 5, causing the sideway flow of electrolyte in a zig-zag form. The flow guides 3-1 and/or 5-1 can increase the conduction of ions and promote rapid electrolysis.

In an alternative embodiment, rather than having a membrane in the PEC cell, the PEC cell is designed such that the PEC cell makes the best use of gravity to separate the gases generated in different compartments. In this way, the use of membrane can be minimized or totally avoided.

Figure 1B:
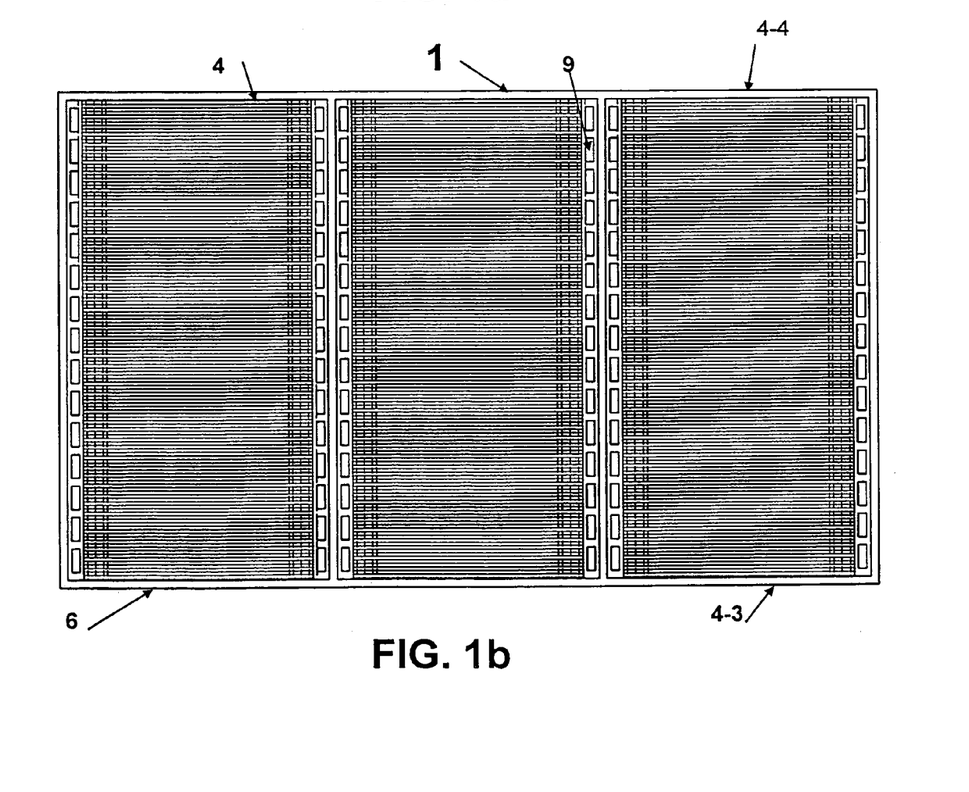
FIG. 1b is the top view.
Figure 1C:
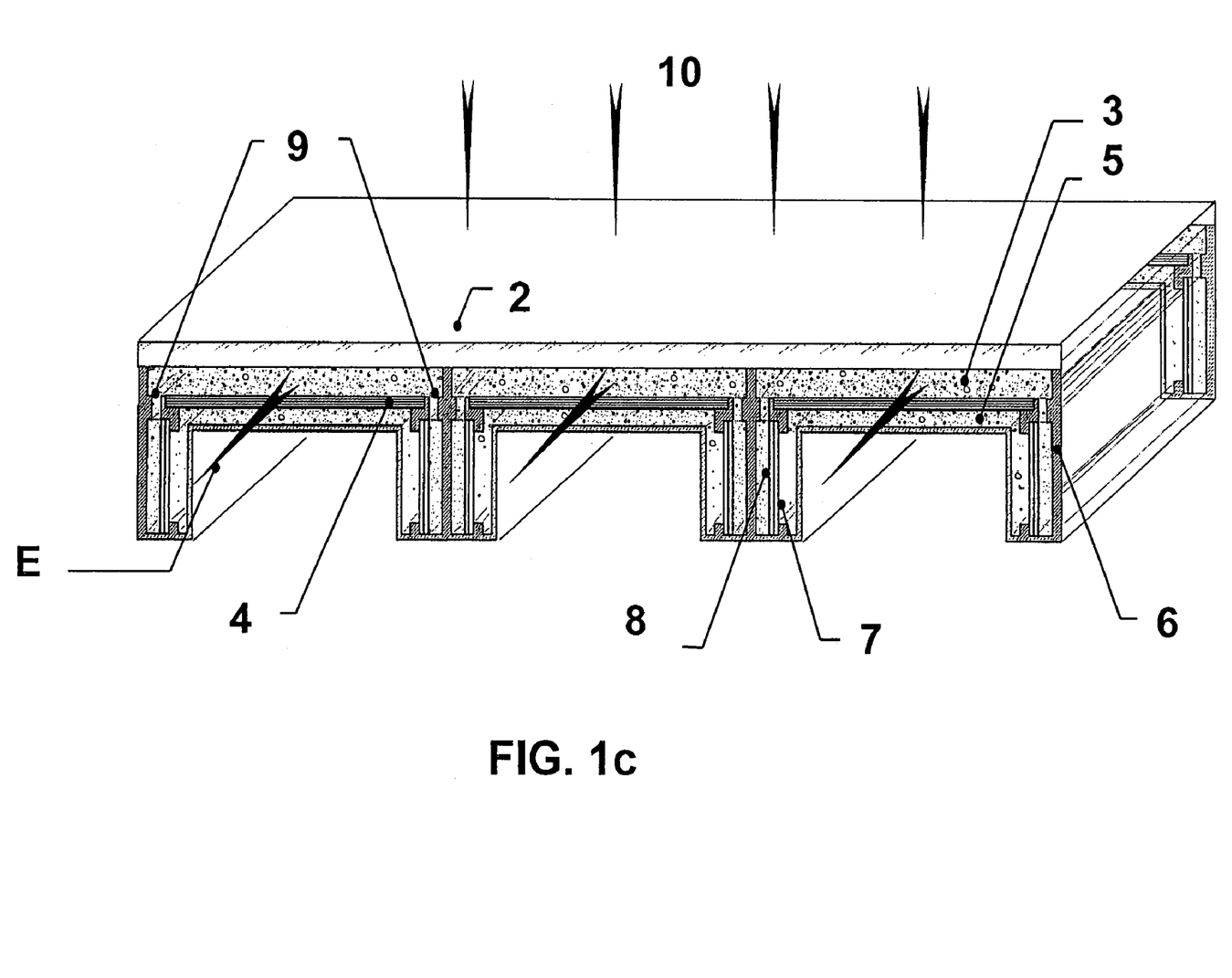
FIG. 1c is a three-dimensional schematic diagram showing more details of the PEC system.

FIG. 1b is a top view of the PEC cell 1 shown in FIG. 1a, showing the via holes 9 and the photoelectrode 4. The electrolyte, in the separate compartments 3 and 5 flows in the direction parallel to the photoelectrode (upward in FIG. 1b). FIG. 1c is a three-dimensional view of the PEC cell showing some of the details depicted in FIG. 1a and FIG. 1b.

Figure 2:
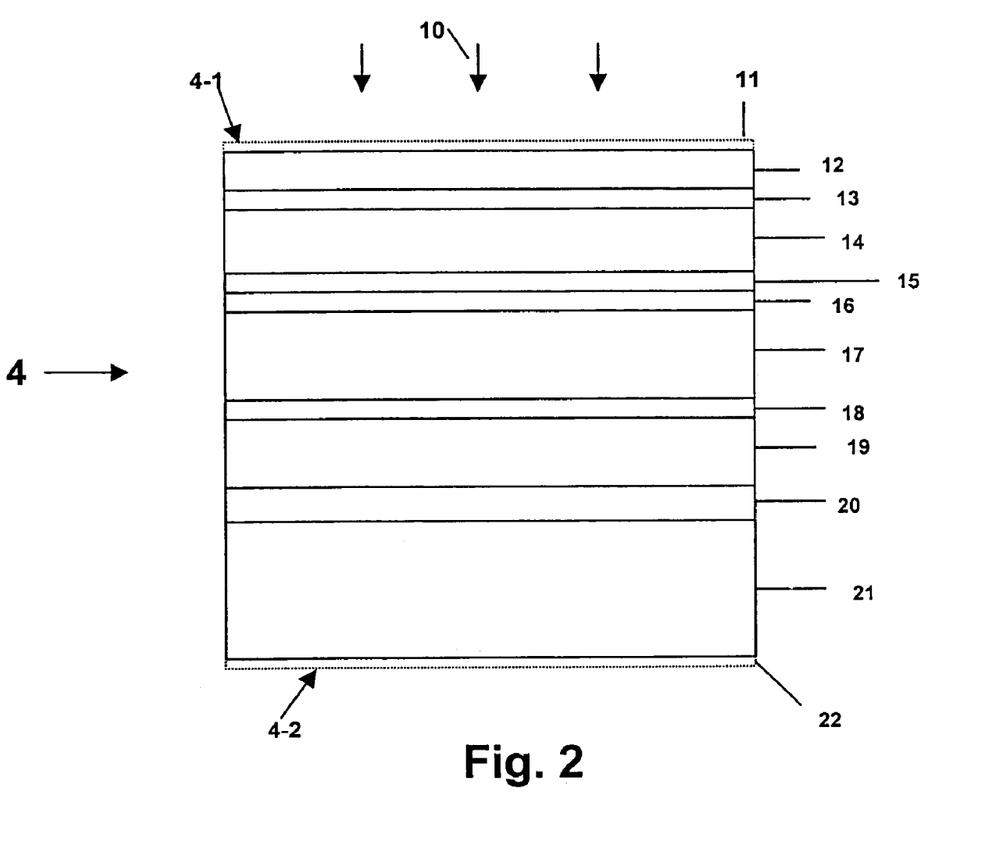
FIG. 2 is a front view of selected amorphous silicon based double-junction solar cell, as an example of the PV structure.

FIG. 2 shows an example of the photoelectrode 4. Amorphous silicon (a-Si) and a-Si based alloys are used as the semiconductor layers in this example. The structure of the photoelectrode shown in FIG. 2 is: metal substrate 21, metal reflector 20, transparent conducting oxide (TCO) 19, n-type a-Si layer 18, intrinsic a-SiGe layer 17, p-type a-Si based layer 16, n-type a-Si layer 15, intrinsic a-Si layer 14, p-type a-Si based layer 13 (nipnip layers), TCO layer 12. The substrate 21 is coated with a hydrogen evolution catalyst 22 and the top TCO layer 12 can be covered with oxygen evolution catalyst 11. Examples of the top TCO layers 12 are tin oxide and fluorine-doped tin oxide. The nipnip layers create a positive voltage bias on the top under sunlight such that oxygen evolutes into the top compartment 3 and hydrogen evolutes into the lower compartment 5.

An alternative structure is: metal substrate 21, metal reflector 20, transparent conducting oxide (TCO) layer 19, p-type a-Si based layer 18, intrinsic a-SiGe layer 17, n-type a-Si layer 16, p-type a-Si based layer 15, intrinsic a-Si layer 14, n-type a-Si layer 13 (pinpin layers), TCO layer 12. The substrate 21 is coated with an oxygen evolution catalyst 22 and the top TCO layer can be covered with hydrogen evolution catalyst 11. The pinpin layers create a negative voltage bias on the top layer 12 under sunlight such that hydrogen evolutes into the top compartment 3 and oxygen evolutes into the lower compartment 5.

Figure 3A:
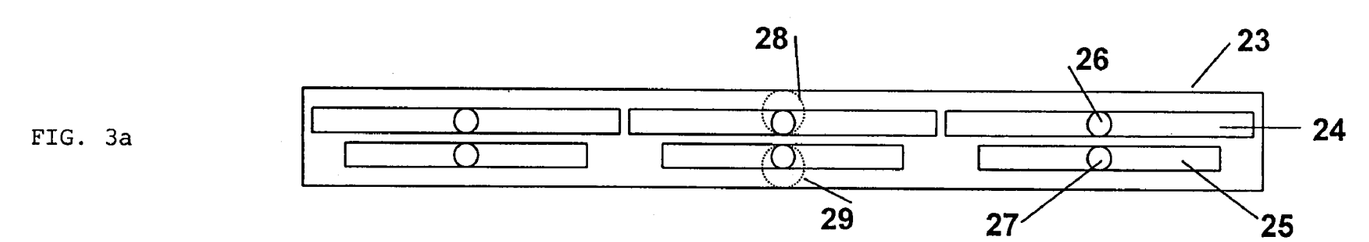
FIG. 3a is a front view and FIG. 3b is the top view.
Figure 3B:
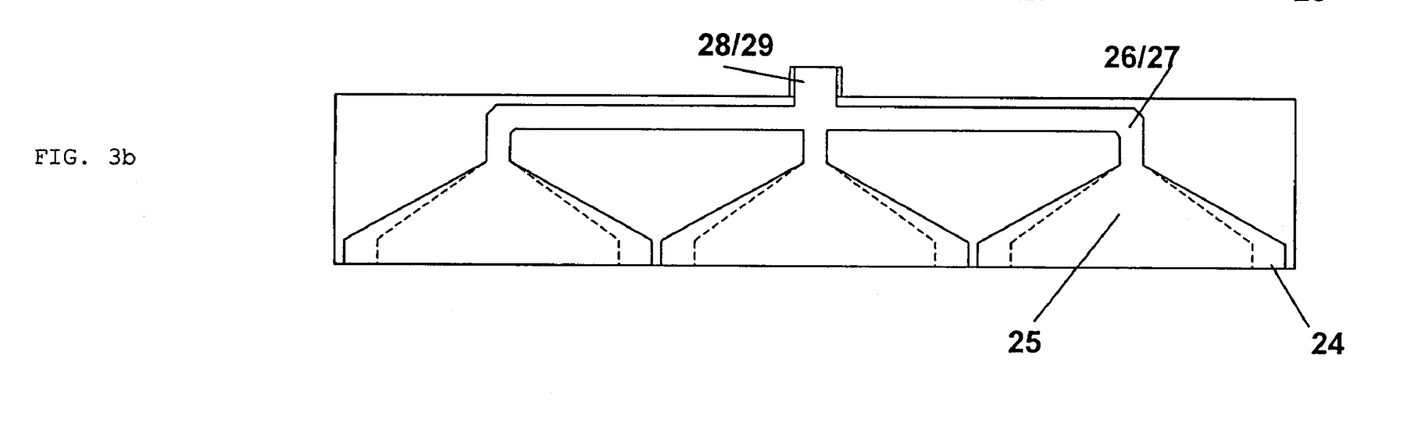
Figure 4:
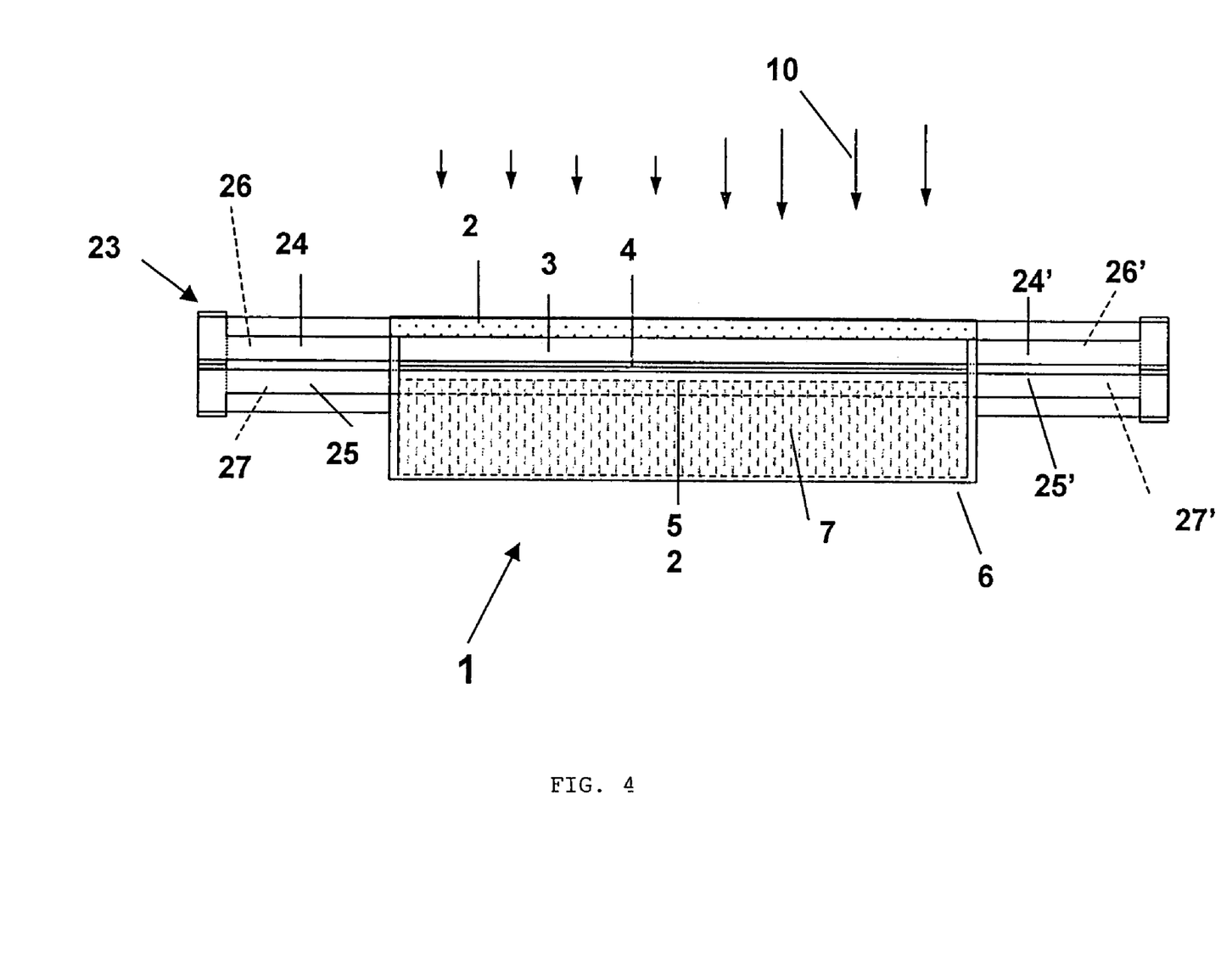
FIG. 4 is a schematic diagram of the side view of the PEC cell with end adaptors.

FIG. 3 shows an end adaptor 23 that delivers electrolyte to the PEC cell 1 or collects electrolyte mixed with oxygen or hydrogen bubbles from PEC cell 1. A top, or first, opening 24 is operatively connected to the top compartment 3 while a bottom, or second, opening 25 is operatively connected to the bottom compartment 5. In the adaptor 23 shown in FIG. 3, electrolyte flows out of PEC cell 1 into first and second openings 24 and 25, then into first and second channels 26 and 27 which are operatively connected thereto, and out of first and second outlet tubes 28 and 29, respectively. FIG. 3a is the front sectional view while FIG. 3b is the top view of the end adaptor 23. FIG. 4 shows a side view of a PEC cell with first and second end adaptors 23 and 23' connected to the PEC cell 1 to allow electrolyte to flow out of and into the PEC cell, respectively.

Description of the PEC System

Figure 5:
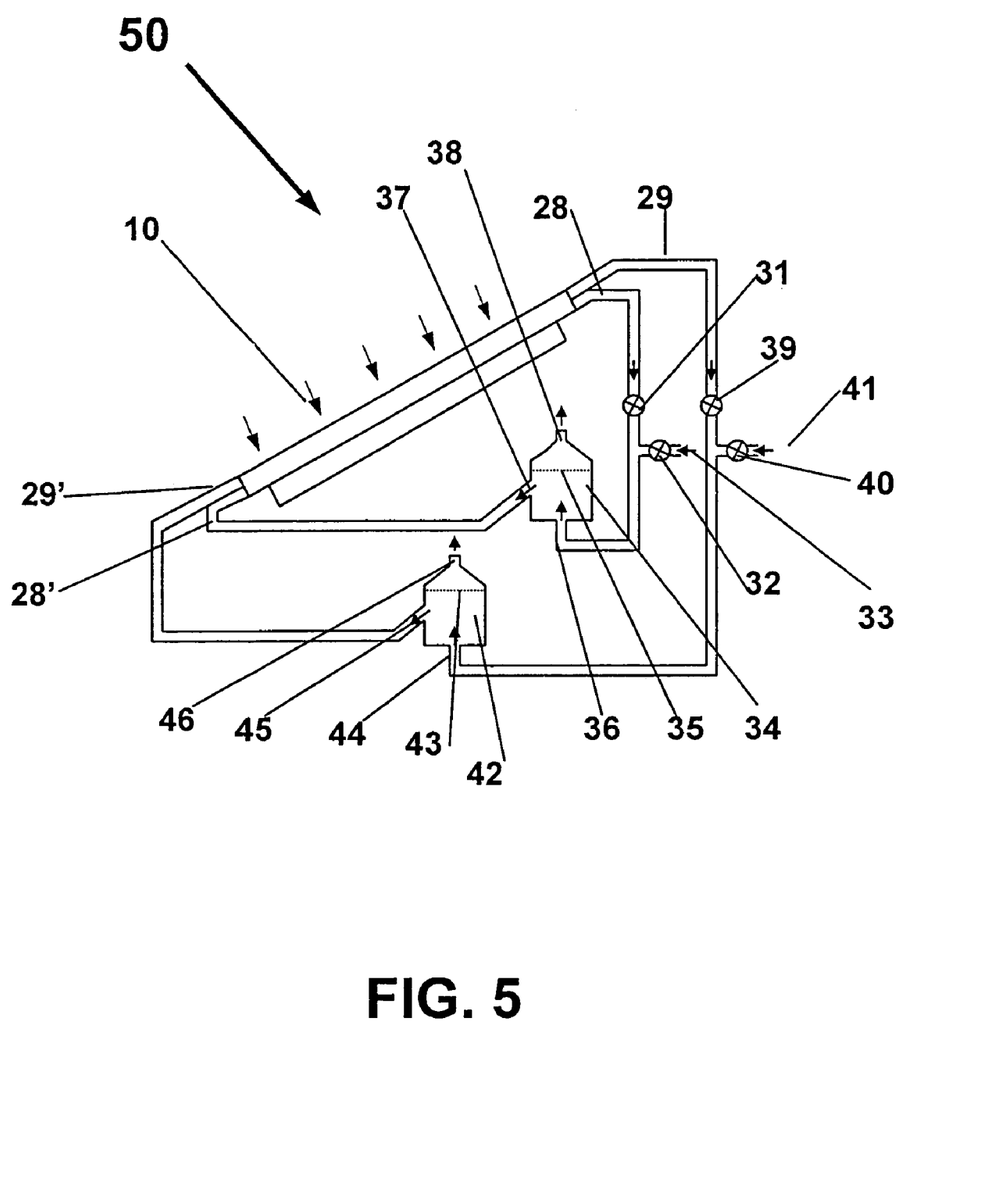
FIG. 5 is a schematic diagram of the PEC system, showing the electrolyte circulation mechanism and gas containers.

FIG. 5 shows a PEC system 50 that uses the PEC cell 1 to generate hydrogen and oxygen. This figure shows the side view as in FIG. 4. In one example, the photoelectrode is a nipnip type cell with positive voltage generated on the radiation side. Hydrogen gas is generated in compartment 5 and exits from the first outlet tube 28 at the end adaptor 23. Oxygen is generated in compartment 3 and exits from the second outlet tube 29. In the embodiment shown, first and second pumps 31 and 39 are used for electrolyte circulation. The gases and electrolyte are circulated by the pumps 31 and 39 into first and second gas collection containers 34 and 42, respectively, through first and second gas collection inlets 36 and 44, respectively. The hydrogen gas is collected at a first collection port 38 on the first gas collection container 34 and the oxygen gas is collected at a second collection port 46 on the second gas collection container 42. Electrolyte flows out of the first and second gas collection containers 34 and 42 through at first and second recycling ports 37 and 45, respectively, back into the compartments 5 and 3 through inlet tubes 28' and 29' in the second end adaptor 23'. When the electrolyte levels 35 and 43 in the first and second gas collection containers 34 and 42, respectively, are low, the respective water inlet valves and switches 32 and 40 will open, allowing additional water to flow into the system via first and second water inlet ports 33 and 41, respectively.

Method to Make the PEC Cell and PEC System

It is to be understood that the present invention contemplates the use of several variations of methods to make the PEC cell 1 and PEC system 50. One example is described herein using the structure described in FIGS. 1-5. A metal foil or plate 21 is used as the substrate. Catalyst 22 is deposited on the substrate (catalyst 22 can also be deposited after the TCO layer 12 is deposited). A reflective metal layer 20, such as aluminum layer, and a TCO layer 19, such as tin oxide or zinc oxide, are then deposited on the metal substrate 21 via thin film deposition processes such as evaporation, sputtering or other suitable methods. This is then followed by deposition of semiconductor layers, such as a-Si based semiconductor layers 13-18. Another TCO layer 12 is then deposited on the topmost layer of the electrode 4. In certain embodiments a thin layer of catalyst can be applied on a top surface of the TCO layer 12. An example of such catalyst is a thin layer of carbon powder with micrometer sized spheres that support nanometer sized Pt particles. The carbon powder can be pressed or bonded to the TCO layer 12. The catalyst on the front surface can be applied to selected regions so that it does not block, or does not block as much of, the incoming radiation, such as sunlight.

In fabrication of the membranes, thin coatings of membrane, such as Nafion®, a product of DuPont is a perfluorinated polymer that contains small proportions of sulfonic or carboxylic ionic functional groups, can be applied onto an inexpensive support 8, such as micro-porous polypropylene. The membrane 7 can be made to have a desired thinness to reduce cost.

It is to be understood that the present invention can be sealed or contained in a suitable holder/container 6. The holder/container can be made of plastic, glass, metal or other materials. The selection of the holder/container material depends on the cost, mechanical strength, and corrosion resistance. The holder/container, such as plastic, can be made using a molding process. The via holes 9 and various mounting mechanisms 9-1 for the photoelectrode and the membrane can be molded on the plastic support/container. After the photoelectrodes 4 are installed inside the container 6, the edges 4-3 and/or 4-4 of the photoelectrode 4 can be protected with a suitable insulating material 9-2 such as an epoxy material.

The container 6 is sealed with the top cover 2, which can be made out of glass, plastic or other materials largely transparent to the radiation.

The end adapter pieces 23 and 23', described in FIG. 3, can be machined to fit the PEC cell 1. Two end adapters, with gas tubes 28, 29, 28' and 29', are installed to the PEC cell for electrolyte inlet and water/gas outlet. Circulation pumps, water inlet values, and the gas collection containers are installed using gas tubes. Hydrogen and oxygen are collected at port 38 and port 46, respectively, or vice versa, depending on the polarity of the photovoltaic structure.

Method to Make Hydrogen and Oxygen

The PEC system 50, with an example shown in FIG. 5, is used to generate hydrogen and oxygen. The system is installed under radiation of sunlight or other suitable radiation such that the radiation enters through the top cover 2. Water is added in ports 41 and 33; hydrogen and oxygen gases are collected at ports 38 and 46, respectively. In using the PEC system, the PEC cell is preferably tilted so that the top cover 2 faces the radiation such as the sunlight. Electrolyte is fed into the lower end-adapter 23' and removed from the higher end-adapter 23. In this way, gravity drives gas bubbles out of the PEC cell and circulates the electrolyte.

EXAMPLES

The photoelectrode can be made using different types of solar cells. Both two-junction and three-junction a-Si based solar cells can be used, for example.

When a two-junction a-Si/a-SiGe solar cell is used, the total voltage can be made to be around 1.6V or higher at operating point, when relative low Ge content is used for the absorber layers. In one embodiment, a specific structure comprises:

stainless steel/aluminum/ZnO/a-Si n/a-SiGe intrinsic/a-Si p or nanocrystalline p/a-Si n/a-Si intrinsic/a-Si p or nanocrystalline p/SnO$_2$:F.

The thickness of the respective layers, are approximately: 0.1 mm/100 nm/500 nm/10 nm/150 nm/10 nm/10 nm/150 nm/10 nm/200 nm, respectively, for optimum sunlight radiation.

The width of each sections of photoelectrode 4 is around 5 to 10 cm while the length can be in the order of 1 m. The optimum width of electrode is determined by the effective ion conduction, the largest active area of electrode under the sunlight, and lowest materials and fabrication costs.

In certain embodiments, the thickness and bandgap of a-Si and a-SiGe intrinsic layers are adjusted such that the two component solar cells generate about the same electrical current under the radiation specified. For electron radiation, it is desired that the thickness of the i-layers be much thicker than for photon radiation.

In certain embodiments, the photovoltaic electrode comprises at least one of the following solar cell types: amorphous silicon (a-Si), cadmium telluride (CdTe), copper indium diselenide (CuInSe$_2$), copper indium gallium diselenide (CIGS), III-V (GaAs, InP etc), crystalline silicon (c-Si), thin film silicon (thin-Si), or variations and combinations thereof. Further, in certain embodiments, the photovoltaic electrode has multiple junctions including two-junctions, three junctions and more junctions wherein sufficient voltage is generated for electrolysis. In still other embodiments, at least one of the photovoltaic junctions in the multiple-junction photoelectrode uses amorphous silicon.

In other embodiments, triple-junction a-Si/a-SiGe/a-SiGe, a-Si/a-Si/a-SiGe, a-Si/a-SiGe/μc-Si, or a-Si/μc-Si/μc-Si solar cells is also used to generate sufficient voltage instead of using a tandem solar cells with two junctions. Further, in certain embodiments, a top-most junction is closest to the radiation in the photovoltaic electrode and comprises a solid-state junction generated between p-type and n-type semiconductors.

The above detailed description of the present invention is given for explanatory purposes. All references disclosed herein are expressly incorporated herein by reference. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A photoelectrochemical (PEC) cell, comprising:
    a) at least one integrated photovoltaic electrode that generates voltage under radiation, the photovoltaic electrode being comprised of: i) a multilayer photovoltaic cell having a stack of semiconductor layers deposited on a conducting substrate, and ii) a transparent, conducting and corrosion-resistant (TCCR) layer on an opposing side of the multilayer material;
    wherein a first side of the photovoltaic electrode serves as an anode and a second side of the photovoltaic electrode serves as a cathode, the polarity depending on the sequence of p-type and n-type doped layers in the semiconductor layers;
    b) at least one electrolyte;
    c) a container that confines electrolyte and the photovoltaic electrode;
    d) top cover that is substantially transparent to radiation; and,
    e) at least one membrane that separates the container into two compartments for separate oxidation and reduction reactions, the membrane conducting ions and separating generated oxygen and hydrogen gases, the membrane being installed in a generally perpendicular orientation relative to the photovoltaic cell in order to allow for maximum radiation to reach the photovoltaic electrode,
    wherein the PEC cell facilitates the interaction of gravity and fluid flow, and
    wherein gravity drives gas bubbles out of the PEC cell and circulates the electrolyte.

2. The PEC cell as in claim 1, wherein the photovoltaic electrode comprises at least one of the following solar cell types: amorphous silicon (a-Si), cadmium telluride (CdTe), copper indium diselenide (CuInSe$_2$), copper indium gallium diselenide (CIGS), (GaAs, InP etc), crystalline silicon (c-Si), thin film silicon (thin-Si), or variations and combinations thereof.

3. The PEC cell as in claim 2, wherein the photovoltaic electrode has multiple junctions including two-junctions, three junctions and more junctions wherein sufficient voltage is generated for electrolysis.

4. The PEC cell as in claim 3, wherein at least one of the photovoltaic junctions in the multiple-junction photovoltaic electrode uses amorphous silicon.

5. The PEC cell as in claim 3, wherein a top-most junction is closest to the radiation in the photovoltaic electrode and the top-most junction comprises a liquid junction between a semiconductor and the electrolyte.

6. The PEC cell as in claim 5, wherein the semiconductor that forms a junction with the electrolyte comprises at least one metal oxide that is stable in the electrolyte.

7. The PEC cell as in claim 6, wherein the metal oxide comprises TiO$_2$, WO$_3$ or Fe$_2$O$_3$ and combinations thereof.

8. The PEC cell as in claim 6, wherein the metal oxide is alloyed with at least one other material, including Ca and/or Mg, to increase radiation absorption.

9. The PEC cell as in claim 5, wherein the semiconductor that forms a junction with the electrolyte comprises at least one compound semiconductor that is stable in electrolyte.

10. The PEC cell as in claim 9, wherein the compound semiconductor includes at least one of: InGaN, GaPN, GaAsPN, GaP and combinations thereof.

11. The PEC cell as in claim 5, wherein the semiconductor that forms a junction with the electrolyte comprises at least one Group IV semiconductor or semiconductor alloy that is stable in electrolyte.

12. The PEC cell as in claim 11, wherein the Group IV semiconductor or semiconductor alloy includes at least one of: Si, C, Ge, Sn, SiC, GeC and combinations thereof.

13. The PEC cell as in claim 3 wherein a top-most junction is closest to the radiation in the photovoltaic electrode and comprises a solid-state junction generated between p-type and n-type semiconductors.

14. The PEC cell as in claim 13, wherein the photoelectrode is coated with a layer of transparent, conducting and corrosion-resistant (TCCR) layer.

15. The PEC cell as in claim 14, wherein the TCCR layer comprises a metal oxide based material.

16. The PEC cell as in claim 15, wherein the metal oxide TCCR layer comprises TiO$_2$, WO$_3$ and Fe$_2$O$_3$, and combination thereof.

17. The PEC cell as in claim 15, wherein the metal oxide TCCR layer is doped with at least one other element, including F, Cl and mixtures thereof, to increase resistance to corrosion.

18. The PEC cell as in claim 15, where in the metal oxide TCCR layer is doped with at least one other element to reduce or remove a rectifying junction between the oxide and the electrolyte and to reduce junction resistance.

19. The PEC cell as in claim 14, wherein the TCCR layer comprises a nitride compound.

20. The PEC cell as in claim 19, wherein the nitride compound comprises InGaN, GaPN, GaAsPN or variations and combinations of thereof, including both crystalline and amorphous forms.

21. The PEC cell as in claim 14, wherein the TCCR layer comprises a carbide compound.

22. The PEC cell as in claim 21, wherein the carbide compound comprises SiC, GeC, or variations and combinations of thereof, including both crystalline and amorphous forms.

23. The PEC cell as in claim 14, wherein the TCCR layer comprises a polymer based composite.

24. A photoelectrochemical (PEC) cell, comprising:
at least one integrated photovoltaic electrode that generates voltage under radiation;
at least one electrolyte;
a container that confines electrolyte;
a top cover that is substantially transparent to radiation;
at least one mechanism that separates the container into two compartments for oxidation and reduction reactions; and
at least one membrane mechanism that separates the container into two compartments for oxidation and reduction reactions, the membrane conducting ions and separating generated gases, the membrane being installed in a generally perpendicular orientation relative to the photovoltaic cell in order to allow for maximum radiation to reach the PEC cell,
wherein the PEC cell facilitates the interaction of gravity and fluid flow, and
wherein gravity drives gas bubbles out of the PEC cell and circulates the electrolyte wherein the photovoltaic electrode comprises at least one of the following solar cell types: amorphous silicon (a-Si), cadmium telluride (CdTe), copper indium diselenide ($CuInSe_2$), copper indium gallium diselenide (CIGS), (GaAs, InP etc.), crystalline silicon (c-Si), thin film silicon (thin-Si), or variations and combinations thereof;
wherein the photovoltaic electrode has multiple junctions including two-junctions, three junctions and more junctions wherein sufficient voltage is generated for electrolysis;
wherein a top-most junction is closest to the radiation in the photovoltaic electrode and comprises a solid-state junction generated between p-type and n-type semiconductors;
wherein the photovoltaic electrode is coated with a layer of transparent, conducting and corrosion-resistant (TCCR) layer;
wherein the TCCR layer comprises a polymer based composite, and
wherein the TCCR polymer based composite comprises nanocomposite materials with a fraction of metal embedded inside to increase electrical conductivity.

25. The PEC cell as in claim 3, wherein the radiation comprises photons, electrons or other energy-carrying radiations and particles.

26. The PEC cell as in claim 25, wherein the radiation comprises solar radiation.

27. The PEC cell as in claim 3, wherein the mechanism that separates the container into two compartments comprises at least one thin ion-exchange membrane.

28. The PEC cell as in claim 27, wherein the membrane comprises at least one of a cation exchange membrane or an anion-exchange membrane.

29. The PEC cell as in claim 27, wherein the ion-exchange membrane is installed behind the photoelectrode and away from the radiation to allow for maximum radiation to reach the photoelectrode.

30. The PEC cell as in claim 29, wherein the membrane comprises a perfluorinated polymer that contains small proportions of sulfonic or carboxylic ionic functional groups.

31. The PEC cell as in claim 30 wherein the membrane is applied onto a support.

32. The PEC cell as in claim 31 wherein the support comprises micro-porous polypropylene.

33. The PEC cell as in claim 3, wherein the electrolyte is acidic.

34. The PEC cell as in claim 3, wherein the electrolyte is alkaline.

35. The PEC system comprising the PEC cell as in claim 3 and further comprising at least one collecting mechanism to collect gases generated by the PEC cell.

36. The PEC system as in claim 35 comprising at least one end adaptor that delivers electrolyte to the PEC cell.

37. The PEC system as in claim 35 comprising collecting electrolyte mixed with oxygen or hydrogen bubbles from the PEC cell.

38. The PEC system as in claim 36, wherein the end adaptor comprises a top opening operatively connected to a top compartment and a bottom compartment opening operatively connected to a bottom compartment, wherein electrolyte flows out of the PEC cell into both the top opening and the bottom opening, through a first channel and a second channel operatively connected to the top and bottom openings, respectively, and out of first and second outlet tubes operatively connected to the first and second channels, respectively.

39. The PEC system as in claim 38, wherein the photoelectrode is an nipnip type cell with positive voltage generated on a radiation side.

40. The PEC system as in claim 38, wherein the photoelectrode is an pinpin type cell with negative voltage generated on a radiation side.

41. The PEC system as in claim 39, wherein hydrogen gas is generated in the bottom compartment and exits from the first outlet tube, and wherein oxygen is generated in the top compartment and exits from the second outlet tube.

42. The PEC system as in claim 40, wherein oxygen gas is generated in the bottom compartment and exits from the first outlet tube, and wherein hydrogen is generated in the top compartment and exits from the second outlet tube.

43. The PEC system as in claim 41, further comprising first and second pumps for circulating electrolyte wherein gases and electrolyte are circulated by the pumps through first and second gas collection containers, respectively, so that hydrogen is collected at a first collection port in a first gas collection container and oxygen is collected at a second collection port in a second gas collection container; and wherein electrolyte flows from the first and second recycling ports, respectively, back into the bottom and top compartments respectively, through third and fourth inlet tubes operatively connected to a second end adaptor on an opposing end of the PEC cell.

44. The PEC system as in claim 42, further comprising first and second pumps for circulating electrolyte wherein gases and electrolyte are circulated by the pumps through first and second gas collection containers, respectively, so that oxygen is collected at a first collection port in a first gas collection container and hydrogen is collected at a second collection port in a second gas collection container; and wherein electrolyte flows from the first and second recycling ports, respectively, back into the bottom and top compartments respectively, through third and fourth inlet tubes operatively connected to a second end adaptor on an opposing end of the PEC cell.

45. The PEC system as in claim 43, further comprising first and second water inlet valves and switches operatively connected via first and second ports, respectively, to the first and second gas collection containers to allow additional water to flow into the system.

46. The PEC system as in claim 44, further comprising first and second water inlet valves and switches operatively connected via first and second ports, respectively, to the first and second gas collection containers to allow additional water to flow into the system.

47. The PEC cell described in claim 1, wherein the substrate comprises a metal foil or plate.

48. The PEC cell described in claim 1, wherein the reflective metal layer comprises an aluminum layer.

49. The PEC cell described in claim 1, wherein the first transparent conducting oxide (TCO) layer comprises at least one of tin oxide or zinc oxide.

50. The PEC cell described in claim 1, wherein the thin film deposition process including at least one of evaporation, sputtering or other suitable deposition method.

51. The PEC cell described in claim 1, wherein the plurality of semiconductor layers comprises a-Si based semiconductor layers.

52. The PEC cell described in claim 1, wherein a thin layer of catalyst is deposited on the second TCO layer.

53. The PEC cell described in claim 1, wherein the catalyst comprises a thin layer of carbon powder with micrometer sized spheres that support nanometer sized Pt particles.

54. The PEC cell described in claim 1, wherein the carbon powder is pressed or bonded to the TCO layer.

55. The PEC cell described in claim 52, wherein the catalyst is applied to selected regions so that the catalyst does not substantially block incoming radiation.

56. The PEC cell of claim 1, wherein the electrode comprises: metal substrate, metal reflector, transparent conducting oxide (TCO), n-type a-Si layer, intrinsic a-SiGe layer or microcrystalline silicon layer, p-type a-Si based layer, n-type a-Si layer, intrinsic a-Si layer or a-SiGe layer, p-type a-Si based layer, n-type a-Si layer, intrinsic a-Si layer, p-type a-Si based layer (nipnipnip layers), TCO layer.

57. The PEC cell of claim 56 wherein the substrate is coated with a hydrogen evolution catalyst and the top TCO layer is covered with an oxygen evolution catalyst.

58. The PEC cell of claim 57 wherein top TCO layers comprise at least one of tin oxide and fluorine-doped tin oxide.

59. The PEC cell described in claim 1, wherein the electrode comprises: metal substrate, metal reflector, transparent conducting oxide (TCO) layer, p-type a-Si based layer, intrinsic a-SiGe layer or microcrystalline silicon layer, n-type a-Si layer, p-type a-Si based layer, intrinsic a-Si layer or a-SiGe layer, n-type a-Si layer, p-type a-Si based layer, intrinsic a-Si layer, n-type a-Si layer (pinpinpin layers), TCO layer.

60. The PEC cell of claim 59, wherein the substrate is coated with an oxygen evolution catalyst and the top TCO layer is covered with a hydrogen evolution catalyst.

61. A photoelectrochemical (PEC) cell system, comprising:
a) at least one integrated photoelectrochemical (PEC) cell 10 that generates voltage under radiation, the photovoltaic electrode being comprised of:
a-i) a multilayer semiconductor material deposited on a conducting substrate 21, and a layer of transparent, conducting and corrosion-resistant (TCCR) layer 2 on a side opposing the conducting substrate;
wherein a first side of the PEC cell 1 serves as an anode and a second side of the PEC cell serves as a cathode, the polarity depending on the sequence of p-type and n-type doped layers in the semiconductor materials; whereby sufficient voltage is generated for electrolysis;
a-ii) at least one electrolyte E;
a-iii) a container 6 that confines electrolyte E and the PEC cell 10;
a-iv) a top cover 2 that is substantially transparent to radiation; and,
a-v) at least one thin ion-exchange membrane 7 that separates the container 6 into a top compartment 3 and a bottom compartment 5, the thin ion-exchange membrane 7 positioned in a generally perpendicular orientation relative to the PEC cell 1,
wherein oxidation and reduction reactions occur in separate compartments, the thin ion exchange membrane 7 allowing exchange of ions while separating gases generated in each compartment; and,
b) a least one end adapter collecting mechanism 23 for collecting gases generated by the PEC cell, comprising:
b-i) a top opening 24 operatively connected to the top compartment 3 for receiving a first supply of electrolyte, and
b-ii) a bottom opening 25 operatively connected to the bottom compartment 5 for receiving a second supply of electrolyte,
wherein electrolyte flows out of the PEC cell into both the top opening 24 and the bottom opening 25;
b-iii) a first channel 26 operatively connected to the top opening 24,
wherein the first supply of electrolyte flows from the first channel 26 to a first outlet tube 28; and,
b-iv) a second channel 27 operatively connected to the bottom opening 25,
wherein the second supply of electrolyte flows from the second channel 27 to a second outlet tube 29.

62. The photoelectrochemical (PEC) cell system of claim 61, the system further including:
c) a first end adaptor mechanism 23 operatively connected to a first end of the photovoltaic electrode;
d) a second end adaptor mechanism 23 operatively connected to a second end of the photovoltaic electrode; and
e) a first electrolyte circulation system comprising:
e-i) a first pump 31 operatively connected to the first outlet tube 28 for circulating a first supply of electrolyte and a first gas,
e-ii) a first gas collection container 34 operatively connected to the first outer tube 28 through a first gas collection inlet 36,
e-iii) a first collection port 38 on the first gas collection container 34 for collecting the first gas; and
e-iv) a first recycling port 37 operatively connected to the first gas collection container 34 for recycling the first supply of electrolyte into a first inlet tube 28' that is operatively connected to the second end adaptor 23'; and f) a second electrolyte circulation system comprising:
- f-i) a second pump 31 operatively connected to the second outlet tube 29 for circulating a second supply of electrolyte and a second gas,
- f-ii) a second gas collection container 42 operatively connected to the second outer tube 29 through a second gas collection inlet 43,
- f-iii) a second collection port 46 on the second gas collection container 42 for collecting the second gas; and
- f-iv) a second recycling port 45 operatively connected to the second gas collection container 42 for recycling the second supply of electrolyte into a second inlet tube 29' that is operatively connected to the second end adaptor 23'.

63. The photoelectrochemical (PEC) cell system of claim 62, wherein the first electrolyte circulation system further includes:
- e-v) a first water inlet valve and switch system 32 configured to supply additional water to flow into the first electrolyte circulation system via a first water inlet port 33; and
- f-v) a second water inlet valve and switch system 40 configured to supply additional water to flow into the second electrolyte circulation system via a second water inlet port 41.

64. The photoelectrochemical (PEC) cell system of claim 61, wherein the photoelectrode is an nipnip type cell with positive voltage generated on a radiation side, and
wherein hydrogen gas is generated in the bottom compartment and exits from the first outlet tube, and wherein oxygen is generated in the top compartment and exits from the second outlet tube.

65. The photoelectrochemical (PEC) cell system of claim 61, wherein the photoelectrode is an pinpin type cell with negative voltage generated on a radiation side; and
wherein oxygen gas is generated in the bottom compartment and exits from the first outlet tube, and wherein hydrogen is generated in the top compartment and exits from the second outlet tube.

66. The photoelectrochemical (PEC) cell of claim 61, wherein the PEC cell is tilted so that the top cover facilitates the interaction of gravity and fluid flow, and
wherein gravity drives gas bubbles out of the PEC cell and circulates the electrolyte.

67. A photoelectrochemical (PEC) cell, comprising:
i) at least one photovoltaic electrode that generates voltage under radiation, the photovoltaic electrode being comprised of a multilayer photovoltaic cell having a stack of semiconductor layers deposited on a conducting substrate, and a layer of transparent, conducting and corrosion-resistant (TCCR) layer on an opposing side of the multilayer material;
wherein a first side of the photovoltaic electrode serves as an anode and a second side of the photovoltaic electrode serves as a cathode, and
wherein the photoelectrode is an nipnip type cell with positive voltage generated on a radiation side;
ii) at least one electrolyte;
iii) a container that confines electrolyte and the photovoltaic electrode;
iv) a top cover that is substantially transparent to; and,
v) at least one mechanism that separates the container into two compartments for oxidation and reduction reactions and positioned in a generally perpendicular orientation relative to the photovoltaic cell, the mechanism allowing an exchange of ions while separating gases generated.

68. A photoelectrochemical (PEC) cell, comprising:
i) at least one photovoltaic electrode that generates voltage under radiation, the photovoltaic electrode being comprised of a multilayer photovoltaic cell having a stack of semiconductor layers deposited on a conducting substrate, and a layer of transparent, conducting and corrosion-resistant (TCCR) layer on an opposing side of the multilayer material;
wherein a first side of the photovoltaic electrode serves as an anode and a second side of the photovoltaic electrode serves as a cathode, and
wherein the photoelectrode is an pinpin type cell with negative voltage generated on a radiation side;
ii) at least one electrolyte;
iii) a container that confines electrolyte and the photovoltaic electrode;
iv) a top cover that is substantially transparent to radiation;
v) a first collection container configured to accumulate hydrogen gas and a second container configured to accumulate oxygen gas; and,
vi) at least one mechanism that separates the container into two compartments for oxidation and reduction reactions and positioned in a generally perpendicular orientation relative to the photovoltaic cell, the mechanism allowing an exchange of ions while separating gases generated.

69. A photoelectrochemical (PEC) cell, comprising:
i) at least one photovoltaic electrode that generates voltage under radiation, the photovoltaic electrode being comprised of a multilayer photovoltaic cell having a stack of semiconductor layers deposited on a conducting substrate, and a layer of transparent, conducting and corrosion-resistant (TCCR) layer on an opposing side of the multilayer material;
wherein a first side of the photovoltaic electrode serves as an anode and a second side of the photovoltaic electrode serves as a cathode, and
wherein the photoelectrode comprises: n-type a-Si layer, intrinsic a-SiGe layer or microcrystalline silicon layer, p-type a-Si based layer, n-type a-Si layer, intrinsic a-Si layer or a-SiGe layer, p-type a-Si based layer, n-type a-Si layer, intrinsic a-Si layer, p-type a-Si based layer (nip-nipnip layers);
ii) at least one electrolyte;
iii) a container that confines electrolyte and the photovoltaic electrode;
iv) a top cover that is substantially transparent to radiation and is comprised of a conductive material; and,
v) at least one mechanism that separates the container into two compartments for oxidation and reduction reactions and positioned in a generally perpendicular orientation relative to the photovoltaic cell, the mechanism allowing an exchange of ions while separating gases generated.

70. A photoelectrochemical (PEC) cell, comprising:
i) at least one photovoltaic electrode that generates voltage under radiation, the photovoltaic electrode being comprised of a multilayer photovoltaic cell having a stack of semiconductor layers deposited on a conducting substrate, and a layer of transparent, conducting and corrosion-resistant (TCCR) layer on an opposing side of the multilayer material;
wherein a first side of the photovoltaic electrode serves as an anode and a second side of the photovoltaic electrode serves as a cathode, and
wherein the photoelectrode comprises: p-type a-Si based layer, intrinsic a-SiGe layer or microcrystalline silicon layer, n-type a-Si layer, p-type a-Si based layer, intrinsic a-Si layer or a-SiGe layer, n-type a-Si layer, p-type a-Si based layer, intrinsic a-Si layer, n-type a-Si layer (pin-pinpin layers);

ii) at least one electrolyte;

iii) a container that confines electrolyte and the photovoltaic electrode;

iv) a top cover that is substantially transparent to radiation and is comprised of a conductive material; and, v) at least one mechanism that separates the container into two compartments for oxidation and reduction reactions and positioned in a generally perpendicular orientation relative to the photovoltaic cell, the mechanism allowing an exchange of ions while separating gases generated.

71. A photoelectrochemical (PEC) cell, comprising:

i) at least one photovoltaic electrode that generates voltage under radiation, the photovoltaic electrode being comprised of a multilayer photovoltaic cell having a stack of semiconductor layers deposited on a conducting substrate, and a layer of transparent, conducting and corrosion-resistant (TCCR) layer on an opposing side of the multilayer material;

wherein a first side of the photovoltaic electrode serves as an anode and a second side of the photovoltaic electrode serves as a cathode, the polarity depending on the sequence of p-type and n-type doped layers in the semiconductor materials;

ii) at least one electrolyte;

iii) a container that confines electrolyte and the photovoltaic electrode;

iv) a top cover that is substantially transparent to radiation;

v) a membrane configured to separate gases and positioned in a generally perpendicular orientation relative to the photovoltaic cell, the membrane being supported by a mounting mechanism having at least one via hole to permit electrolyte flow therethrough; and, wherein the PEC cell is oriented so that the flow of the electrolyte and separation of gases generated by oxidation and reduction reactions is aided by gravity.

72. The PEC cell as in claim 1, wherein the photovoltaic electrode comprises at least two multilayered photovoltaic cells.

73. The PEC cell as in claim 1, having at least two independent photovoltaic electrodes within the container.

* * * * *

UNITED STATES PATENT AND TRADEMARK OFFICE
CERTIFICATE OF CORRECTION

PATENT NO. : 7,750,234 B2
APPLICATION NO. : 11/134929
DATED : July 6, 2010
INVENTOR(S) : Xumming Deng et al.

It is certified that error appears in the above-identified patent and that said Letters Patent is hereby corrected as shown below:

Column 9, Claim 1, Line 66, before "top", insert -- a --.

Column 10, Claim 9, Line 40, before "compound", insert -- III-V --.

Column 10, Claim 10, Line 41, before "compound", insert -- III-V --.

Column 11, Claim 24, Line 43, after "CIGS", insert -- III-V --.

Column 15, Claim 67, Line 57, after "is", change "an" to -- a --.

Column 16, Claim 68, Line 12, after "is", change "an" to -- a --.

Signed and Sealed this

Twenty-first Day of September, 2010

David J. Kappos
*Director of the United States Patent and Trademark Office*